United States Patent

Batchelor et al.

(10) Patent No.: US 8,439,980 B2
(45) Date of Patent: *May 14, 2013

(54) SHADING COMPOSITION

(75) Inventors: Stephen Norman Batchelor, Wirral (GB); Jayne Michelle Bird, Wirral (GB)

(73) Assignee: Conopco, Inc., S. Wing Englewood Cliffs, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/264,428

(22) PCT Filed: Apr. 8, 2010

(86) PCT No.: PCT/EP2010/054632
§ 371 (c)(1),
(2), (4) Date: Oct. 14, 2011

(87) PCT Pub. No.: WO2010/127919
PCT Pub. Date: Nov. 11, 2010

(65) Prior Publication Data
US 2012/0036652 A1 Feb. 16, 2012

(30) Foreign Application Priority Data

May 5, 2009 (EP) .................................. 09159452

(51) Int. Cl.
| C11D 3/40 | (2006.01) |
| C11D 3/42 | (2006.01) |
| C09B 17/02 | (2006.01) |
| C09B 17/04 | (2006.01) |

(52) U.S. Cl.
USPC ................ 8/137; 8/636; 8/657; 510/276

(58) Field of Classification Search .............. 8/137, 648, 8/655, 657, 636; 510/276
See application file for complete search history.

(56) References Cited

U.S. PATENT DOCUMENTS

| 6,616,708 | B2* | 9/2003 | Ohashi et al. ............... 8/405 |
| 2004/0256598 | A1* | 12/2004 | Plos et al. ................ 252/299.01 |
| 2006/0010617 | A1* | 1/2006 | Gourlaouen et al. ............ 8/405 |
| 2011/0131736 | A1* | 6/2011 | Batchelor et al. ................ 8/137 |

FOREIGN PATENT DOCUMENTS

| DE | 19746137 | | 4/1999 |
| DE | 19746137 | A1 | 4/1999 |
| EP | 1645296 | | 4/2006 |
| WO | WO2007039042 | A1 | 4/2007 |
| WO | WO2008017570 | | 2/2008 |

OTHER PUBLICATIONS

PCT International Search Report in PCT application PCT/EP2010/054632.
PCT International Written Opinion PCT/EP2010.054632.
EP Search Report in EP application Ep 09 15 9452.
PCT International Search Report in PCT application PCT/EP2009/051788.
PCT International Search Report in PCT application PCT/EP2009/051785.
Co-pending Application: Applicant: Batchelor et al., U.S. Appl. No. 12/993,096, filed Nov. 17, 2010.
Co-pending Application: Applicant: Batchelor et al., U.S. Appl. No. 12/993,097, filed Nov. 17, 2010.

* cited by examiner

*Primary Examiner* — Lorna M Douyon
*Assistant Examiner* — Amina Khan
(74) *Attorney, Agent, or Firm* — Rimma Mitelman

(57) ABSTRACT

The present invention provides a laundry treatment composition comprising a cationic azine dye.

10 Claims, No Drawings

SHADING COMPOSITION

FIELD OF INVENTION

The present invention relates to the delivery of dyes to fabrics.

BACKGROUND OF THE INVENTION

Many white garments are created from either pure cotton or polyester cotton blends. Polyester cotton blends typically contain greater than 60% polyester. To enhance whiteness shading dyes may be included in domestic wash products that deposit onto fabrics to counter-act yellowing and greying of the fabric. WO 2008/017570 (Unilever) discloses the use of acid azine dyes as shading agents for domestic wash product. Acid azine dyes carry negatively charges substituents making the net charge of the dye anionic. Acid azine dyes deposit onto cotton but do not build up over multiple washes, preventing overblueing. Acid azine dyes deposit poorly to polyester-cotton blended garments and provide no deposition to polyester garments. The poor deposition on polycotton is thought to be due to the low cotton content of these garments. A shading system is required which give good deposition to polycotton, without unacceptably large deposition to cotton garment in the same wash.

U.S. Pat. No. 6,616,708, to Kao, discloses the use of cationic azine dyes in hair dye compositions.

WO 2007/039042 discloses Basic Violet 5 and Basic Violet 6 for use in laundry detergent compositions.

SUMMARY OF THE INVENTION

Selected cationic azine dyes have a high substantivity to polycotton whilst depositing well on cotton and are relatively alkaline stable and weight efficient.

The cationic azine dyes described herein have the further advantage of being substantive to pure polyester garments.

The cationic azine dyes described herein also have the advantage of providing good whiteness improvement to the fabric with little dulling of the fabric.

The cationic azine dyes described herein have the further advantage of showing no-build up behaviour on a range of fabrics.

In one aspect the present invention provides a laundry treatment composition comprising:
(i) from 2 to 70 wt % of a surfactant; and,
(ii) from 0.0001 to 0.1 wt % of a blue or violet cationic azine dye which is not covalently bound to a negatively charged substituent, the azine dye selected from the following structure:

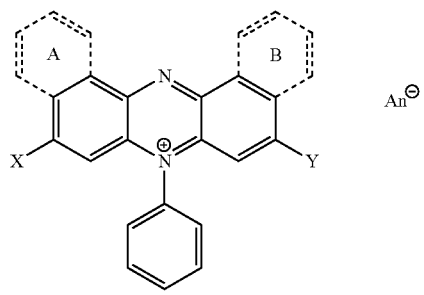

wherein An– is a negative anion;

rings A and B are absent or only one of rings A and B are present;

Y is selected from: —NHAr, wherein Ar is unsubstituted or substituted and is naphthyl or phenyl;

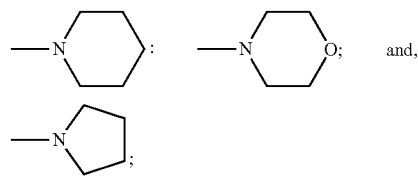

X is selected from H; C1-C4 branched or linear alkyl (preferably $CH_3$);

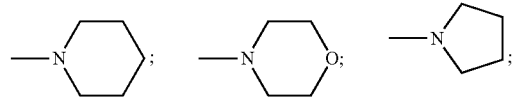

and when Y is selected from:

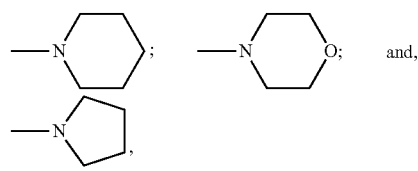

X may also be selected from —$NR_1R_2$, wherein $R_1$ and $R_2$ are selected from a polyether chain, benzyl, phenyl, amine substituted benzyl, amine substituted phenyl, $COCH_3$, a linear or branched alkyl chain; a linear or branched alkyl chain which may be substituted by one or more groups selected from: ester groups; Cl; F; CN; OH; $CH_3O$—; $C_2H_5O$—; and, phenyl; $NHR_1$; and, wherein when rings A and B are absent and when Y═—NHAr then X may also be selected from: —$NH_2$; —NHAr; and, —$NHR_1$.

In another aspect the present invention provides a domestic method of treating a textile, the method comprising the steps of:
(i) treating a textile with an aqueous solution of the azine dye, the aqueous solution comprising from 1 ppb to 1 ppm of the azine dye; and, from 0.0 g/L to 3 g/L of a surfactant; and,
(ii) optionally rinsing and drying the textile.

DETAILED DESCRIPTION OF THE INVENTION

The nature of An⁻ is not an essential aspect of the invention and may be varied widely. X⁻ may be an anion such as $RCOO^-$, $BPh_4^-$, $ClO_4^-$, $BF_4^-$, $PF_6^-$, $RSO_3^-$, $RSO_4^-$, $SO_4^{2-}$, $NO_3^-$, $F^-$, $Cl^-$, $Br^-$, or $I^-$, with R being hydrogen, optionally substituted alkyl or optionally substituted aryl. Preferably X— is selected from: $CH_3SO_3^-$, $CH_3CO_2^-$, $BF_4^-$, $Cl^-$, $F^-$, $Br^-$, and $I^-$.

Preferably Y is NHAr where Ar is phenyl or substituted phenyl. In another embodiment, preferably, Y is selected from:

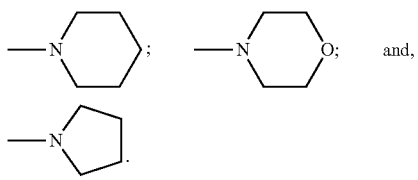

Preferably rings A and B are absent.

Most preferably X=—NR$_1$R$_2$, —NHR$_1$, NH$_2$ or NHAr.

The following are especially preferred substituted and unsubstituted structures of cationic azine dyes:

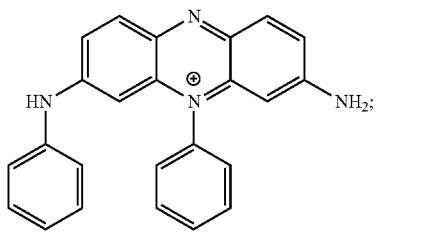

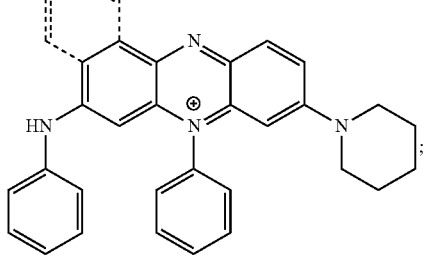

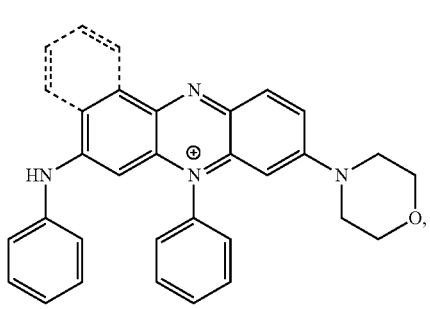

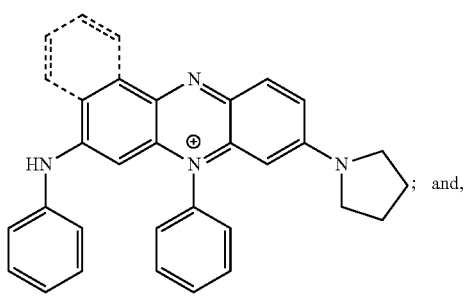

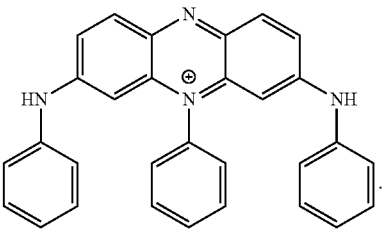

The dashed ring indicates that a further aromatic ring may be present or absent.

It is preferred that the azine dye is further substituted by uncharged organic groups having a total molecular weight of less than 400. Preferred uncharged organic groups are selected from: NHCOCH$_3$, CH$_3$, C$_2$H$_5$, CH$_3$O, C$_2$H$_5$O, amine, Cl, F, Br, I, NO$_2$, CH$_3$SO$_2$, and CN.

Exemplified Preferred Structures

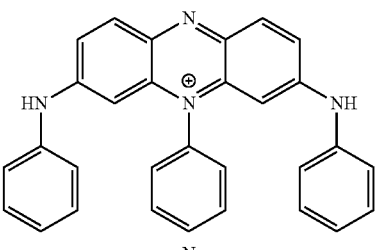

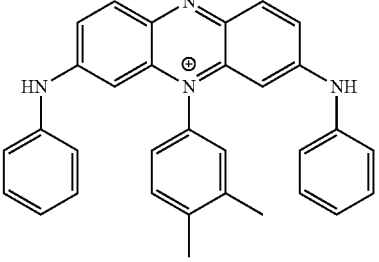

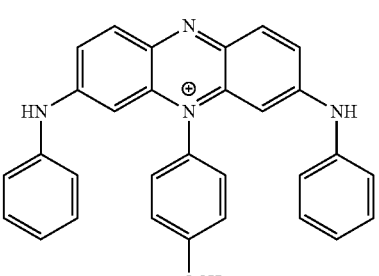

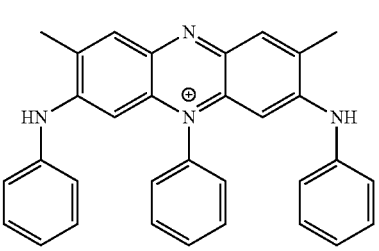

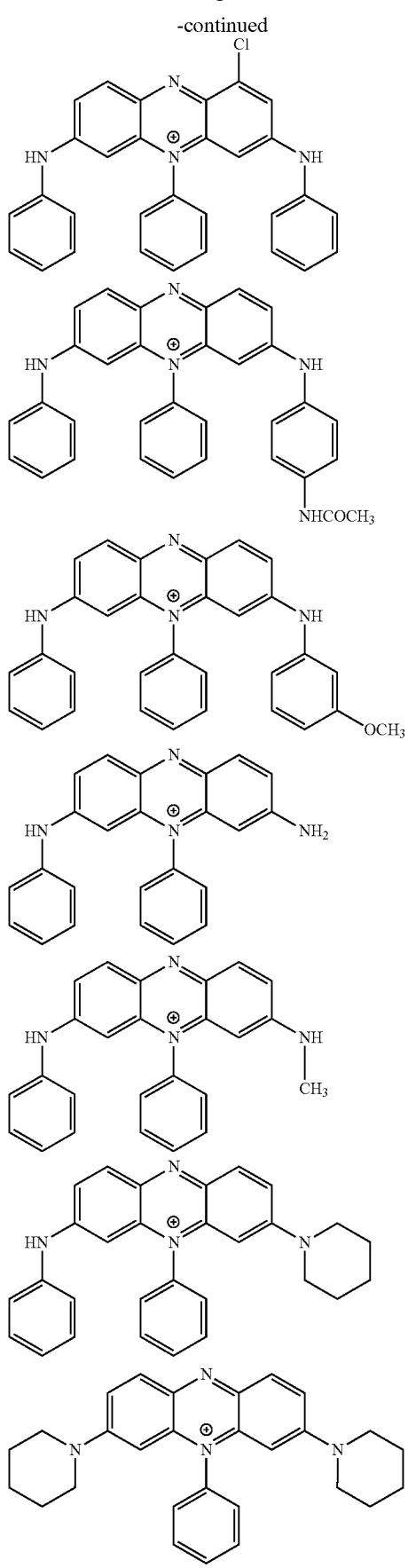
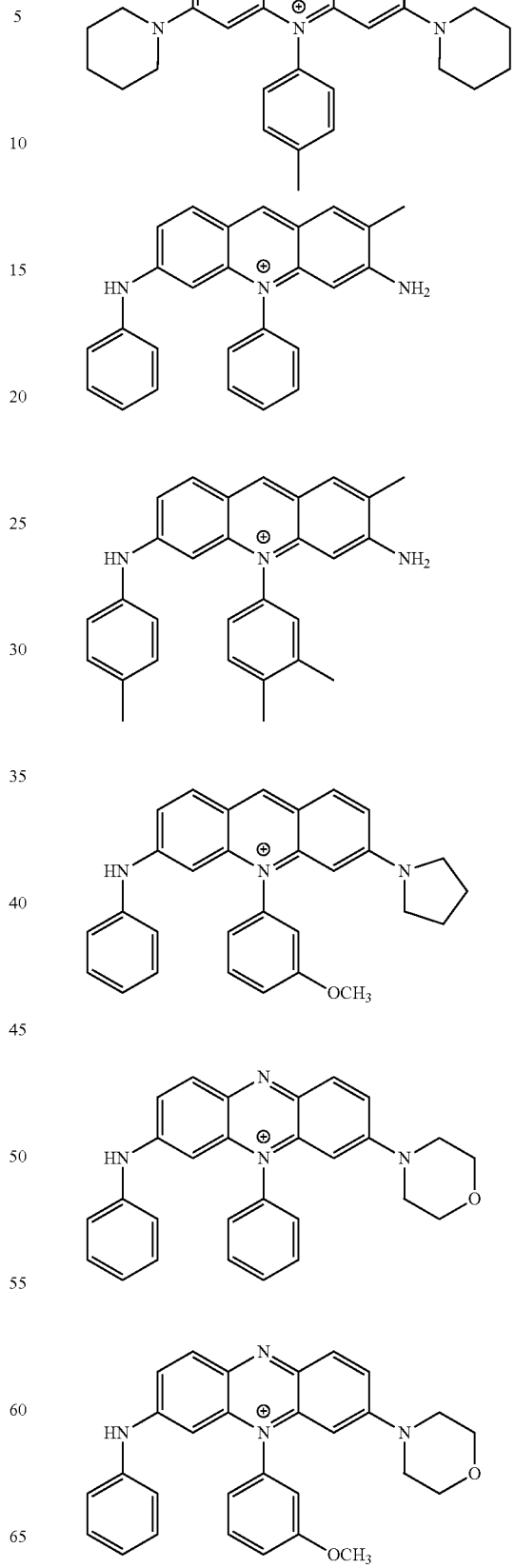

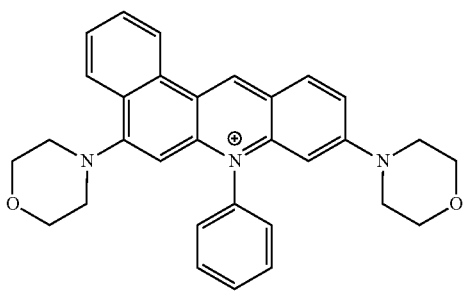
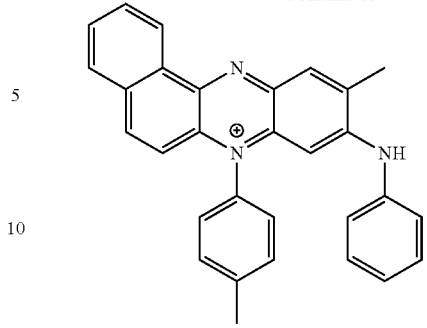
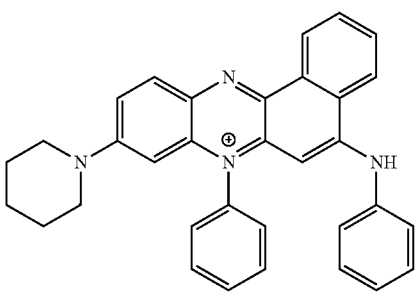
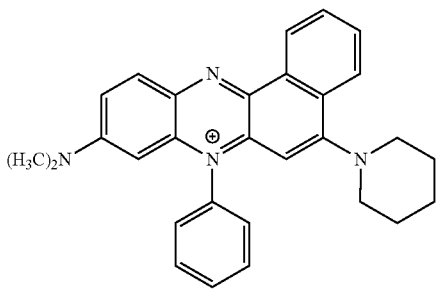
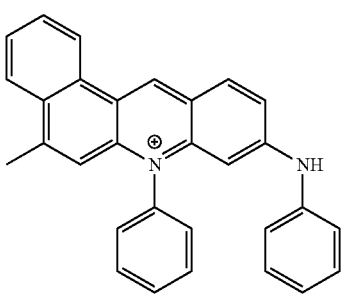
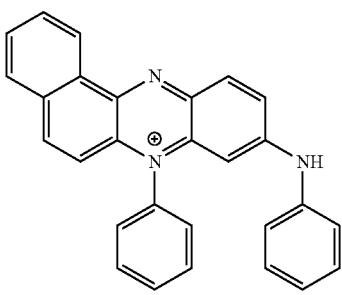

Other Dyes

In a preferred embodiment of the invention, other shading colourants may be present that build up over multiple washes, thereby counteracting long term yellowing and greying effect. They are preferably selected from blue and violet pigment such as pigment violet 23, solvent and disperse dyes such as solvent violet 13, disperse violet 28, bis-azo direct dyes such as direct violet 9, 35, 51 and 99, and triphenodioxazine direct dyes such as direct violet 54.

Even more preferred is the presence of acid azine dyes as described in WO 2008/017570; the level of the acid azine dyes should be in the range from 0.0001 to 0.1 wt %. The acid azine dyes provide benefit predominately to the pure cotton garments and the cationic azine dyes to the polycotton garments. Preferred acid azine dyes are acid violet 50, acid blue 59 and acid blue 98. Preferably they are added to the formulation together with the cationic azine dye.

Photobleaches such as sulphonated Zn/Al phthalocyanins may be present.

Surfactant

The composition comprises between 2 to 70 wt % of a surfactant, most preferably 10 to 30 wt %. In general, the nonionic and anionic surfactants of the surfactant system may be chosen from the surfactants described "Surface Active Agents" Vol. 1, by Schwartz & Perry, Interscience 1949, Vol. 2 by Schwartz, Perry & Berch, Interscience 1958, in the current edition of "McCutcheon's Emulsifiers and Detergents" published by Manufacturing Confectioners Company or in "Tenside-Taschenbuch", H. Stache, 2nd Edn., Carl Hauser Verlag, 1981. Preferably the surfactants used are saturated.

Suitable nonionic detergent compounds which may be used include, in particular, the reaction products of compounds having a hydrophobic group and a reactive hydrogen atom, for example, aliphatic alcohols, acids, amides or alkyl phenols with alkylene oxides, especially ethylene oxide either alone or with propylene oxide. Specific nonionic detergent compounds are $C_6$ to $C_{22}$ alkyl phenol-ethylene oxide condensates, generally 5 to 25 EO, i.e. 5 to 25 units of ethylene oxide per molecule, and the condensation products of aliphatic $C_8$ to $C_{18}$ primary or secondary linear or branched alcohols with ethylene oxide, generally 5 to 40 EO.

Suitable anionic detergent compounds which may be used are usually water-soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic detergent compounds are sodium and potassium alkyl sulphates, especially those obtained by sulphating higher $C_8$ to $C_{18}$ alcohols, produced for example from tallow or coconut oil, sodium and potassium alkyl $C_9$ to $C_{20}$ benzene sulphonates, particularly sodium linear secondary alkyl $C_{10}$ to $C_{15}$ benzene sulphonates; and sodium alkyl glyceryl ether sulphates, especially those ethers of the higher alcohols derived from tallow or coconut oil and synthetic alcohols derived from petroleum. The preferred anionic detergent compounds are sodium $C_{11}$ to $C_{15}$ alkyl benzene sulphonates and sodium $C_{12}$ to $C_{18}$ alkyl sulphates. Also applicable are surfactants such as those described in EP-A-328 177 (Unilever), which show resistance to salting-out, the alkyl polyglycoside surfactants described in EP-A-070 074, and alkyl monoglycosides.

Preferred surfactant systems are mixtures of anionic with nonionic detergent active materials, in particular the groups and examples of anionic and nonionic surfactants pointed out in EP-A-346 995 (Unilever). Especially preferred is surfactant system that is a mixture of an alkali metal salt of a $C_{16}$ to $C_{18}$ primary alcohol sulphate together with a $C_{12}$ to $C_{15}$ primary alcohol 3 to 7 EO ethoxylate.

The nonionic detergent is preferably present in amounts greater than 10%, e.g. 25 to 90 wt % of the surfactant system. Anionic surfactants can be present for example in amounts in the range from about 5% to about 40 wt % of the surfactant system.

In another aspect which is also preferred the surfactant may be a cationic such that the formulation is a fabric conditioner.

Cationic Compound

When the present invention is used as a fabric conditioner it needs to contain a cationic compound.

Most preferred are quaternary ammonium compounds.

It is advantageous if the quaternary ammonium compound is a quaternary ammonium compound having at least one $C_{12}$ to $C_{22}$ alkyl chain.

It is preferred if the quaternary ammonium compound has the following formula:

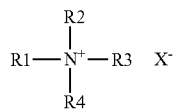

in which $R^1$ is a $C_{12}$ to $C_{22}$ alkyl or alkenyl chain; $R^2$, $R^3$ and $R^4$ are independently selected from $C_1$ to $C_4$ alkyl chains and $X^-$ is a compatible anion. A preferred compound of this type is the quaternary ammonium compound cetyl trimethyl quaternary ammonium bromide.

A second class of materials for use with the present invention are the quaternary ammonium of the above structure in which $R^1$ and $R^2$ are independently selected from $C_{12}$ to $C_{22}$ alkyl or alkenyl chain; $R^3$ and $R^4$ are independently selected from $C_1$ to $C_4$ alkyl chains and $X^-$ is a compatible anion.

A detergent composition according to claim 1 in which the ratio of (ii) cationic material to (iv) anionic surfactant is at least 2:1.

Other suitable quaternary ammonium compounds are disclosed in EP 0 239 910 (Proctor and Gamble).

It is preferred if the ratio of cationic to nonionic surfactant is from 1:100 to 50:50, more preferably 1:50 to 20:50.

The cationic compound may be present from 1.5 wt % to 50 wt % of the total weight of the composition. Preferably the cationic compound may be present from 2 wt % to 25 wt %, a more preferred composition range is from 5 wt % to 20 wt %.

The softening material is preferably present in an amount of from 2 to 60% by weight of the total composition, more preferably from 2 to 40%, most preferably from 3 to 30% by weight.

The composition optionally comprises a silicone.

Builders or Complexing Agents:

Builder materials may be selected from 1) calcium sequestrant materials, 2) precipitating materials, 3) calcium ion-exchange materials and 4) mixtures thereof.

Examples of calcium sequestrant builder materials include alkali metal polyphosphates, such as sodium tripolyphosphate and organic sequestrants, such as ethylene diamine tetra-acetic acid.

Examples of precipitating builder materials include sodium orthophosphate and sodium carbonate.

Examples of calcium ion-exchange builder materials include the various types of water-insoluble crystalline or amorphous aluminosilicates, of which zeolites are the best known representatives, e.g. zeolite A, zeolite B (also known as zeolite P), zeolite C, zeolite X, zeolite Y and also the zeolite P-type as described in EP-A-0,384,070.

The composition may also contain 0-65% of a builder or complexing agent such as ethylenediaminetetraacetic acid, diethylenetriamine-pentaacetic acid, alkyl- or alkenylsuccinic acid, nitrilotriacetic acid or the other builders mentioned below. Many builders are also bleach-stabilising agents by virtue of their ability to complex metal ions.

Zeolite and carbonate (carbonate (including bicarbonate and sesquicarbonate) are preferred builders.

The composition may contain as builder a crystalline aluminosilicate, preferably an alkali metal aluminosilicate, more preferably a sodium aluminosilicate. This is typically present at a level of less than 15% w. Aluminosilicates are materials having the general formula:

where M is a monovalent cation, preferably sodium. These materials contain some bound water and are required to have a calcium ion exchange capacity of at least 50 mg CaO/g. The preferred sodium aluminosilicates contain 1.5-3.5 $SiO_2$ units in the formula above. They can be prepared readily by reaction between sodium silicate and sodium aluminate, as amply described in the literature. The ratio of surfactants to alumuminosilicate (where present) is preferably greater than 5:2, more preferably greater than 3:1.

Alternatively, or additionally to the aluminosilicate builders, phosphate builders may be used. In this art the term 'phosphate' embraces diphosphate, triphosphate, and phosphonate species. Other forms of builder include silicates, such as soluble silicates, metasilicates, layered silicates (e.g. SKS-6 from Hoechst).

Preferably the laundry detergent formulation is a non-phosphate built laundry detergent formulation, i.e., contains less than 1 wt % of phosphate. Preferably the laundry detergent formulation is carbonate built.

Fluorescent Agent

The composition preferably comprises a fluorescent agent (optical brightener). Fluorescent agents are well known and many such fluorescent agents are available commercially. Usually, these fluorescent agents are supplied and used in the form of their alkali metal salts, for example, the sodium salts. The total amount of the fluorescent agent or agents used in the composition is generally from 0.005 to 2 wt %, more preferably 0.01 to 0.1 wt %. Preferred classes of fluorescer are: Di-styryl biphenyl compounds, e.g. Tinopal (Trade Mark) CBS-X, Di-amine stilbene di-sulphonic acid compounds, e.g. Tinopal DMS pure Xtra and Blankophor (Trade Mark) HRH, and Pyrazoline compounds, e.g. Blankophor SN. Preferred fluorescers are: sodium 2 (4-styryl-3-sulfophenyl)-2H-napthol[1,2-d]triazole, disodium 4,4'-bis{[(4-anilino-6-(N methyl-N-2 hydroxyethyl)amino 1,3,5-triazin-2-yl)] amino}stilbene-2-2' disulfonate, disodium 4,4'-bis{[(4- anilino-6-morpholino-1,3,5-triazin-2-yl)]amino}stilbene-2-2' disulfonate, and disodium 4,4'-bis(2-sulfostyryl)biphenyl.

It is preferred that the aqueous solution used in the method has a fluorescer present. When a fluorescer is present in the aqueous solution used in the method it is preferably in the range from 0.0001 g/l to 0.1 g/l, preferably 0.001 to 0.02 g/l.

Perfume

Preferably the composition comprises a perfume. The perfume is preferably in the range from 0.001 to 3 wt %, most preferably 0.1 to 1 wt %. Many suitable examples of perfumes are provided in the CTFA (Cosmetic, Toiletry and Fragrance Association) 1992 International Buyers Guide, published by CFTA Publications and OPD 1993 Chemicals Buyers Directory 80th Annual Edition, published by Schnell Publishing Co.

It is commonplace for a plurality of perfume components to be present in a formulation. In the compositions of the present invention it is envisaged that there will be four or more, preferably five or more, more preferably six or more or even seven or more different perfume components.

In perfume mixtures preferably 15 to 25 wt % are top notes. Top notes are defined by Poucher (Journal of the Society of Cosmetic Chemists 6(2):80 [1955]). Preferred top-notes are selected from citrus oils, linalool, linalyl acetate, lavender, dihydromyrcenol, rose oxide and cis-3-hexanol.

Perfume and top note may be used to cue the whiteness benefit of the invention.

It is preferred that the laundry treatment composition does not contain a peroxygen bleach, e.g., sodium percarbonate, sodium perborate, and peracid.

Polymers

The composition may comprise one or more polymers. Examples are carboxymethylcellulose, poly (ethylene glycol), poly(vinyl alcohol), polycarboxylates such as polyacrylates, maleic/acrylic acid copolymers and lauryl methacrylate/acrylic acid copolymers.

Polymers present to prevent dye deposition, for example poly(vinylpyrrolidone), poly(vinylpyridine-N-oxide), and poly(vinylimidazole), are preferably absent from the formulation.

Enzymes

One or more enzymes are preferred present in a composition of the invention and when practicing a method of the invention.

Preferably the level of each enzyme is from 0.0001 wt % to 0.1 wt % protein.

Especially contemplated enzymes include proteases, alpha-amylases, cellulases, lipases, peroxidases/oxidases, pectate lyases, and mannanases, or mixtures thereof.

Suitable lipases include those of bacterial or fungal origin. Chemically modified or protein engineered mutants are included. Examples of useful lipases include lipases from *Humicola* (synonym *Thermomyces*), e.g. from *H. lanuginosa* (*T. lanuginosus*) as described in EP 258 068 and EP 305 216 or from *H. insolens* as described in WO 96/13580, a *Pseudomonas* lipase, e.g. from *P. alcaligenes* or *P. pseudoalcaligenes* (EP 218 272), *P. cepacia* (EP 331 376), *P. stutzeri* (GB 1,372,034), *P. fluorescens*, *Pseudomonas* sp. strain SD 705 (WO 95/06720 and WO 96/27002), *P. wisconsinensis* (WO 96/12012), a *Bacillus* lipase, e.g. from *B. subtilis* (Dartois et al. (1993), Biochemica et Biophysica Acta, 1131, 253-360), *B. stearothermophilus* (JP 64/744992) or *B. pumilus* (WO 91/16422).

Other examples are lipase variants such as those described in WO 92/05249, WO 94/01541, EP 407 225, EP 260 105, WO 95/35381, WO 96/00292, WO 95/30744, WO 94/25578, WO 95/14783, WO 95/22615, WO 97/04079 and WO 97/07202, WO 00/60063.

Preferred commercially available lipase enzymes include Lipolase™ and Lipolase Ultra™, Lipex™ (Novozymes A/S).

The method of the invention may be carried out in the presence of phospholipase classified as EC 3.1.1.4 and/or EC 3.1.1.32. As used herein, the term phospholipase is an enzyme which has activity towards phospholipids. Phospholipids, such as lecithin or phosphatidylcholine, consist of glycerol esterified with two fatty acids in an outer (sn-1) and the middle (sn-2) positions and esterified with phosphoric acid in the third position; the phosphoric acid, in turn, may be esterified to an amino-alcohol. Phospholipases are enzymes which participate in the hydrolysis of phospholipids. Several types of phospholipase activity can be distinguished, including phospholipases $A_1$ and $A_2$ which hydrolyze one fatty acyl group (in the sn-1 and sn-2 position, respectively) to form lysophospholipid; and lysophospholipase (or phospholipase B) which can hydrolyze the remaining fatty acyl group in lysophospholipid. Phospholipase C and phospholipase D (phosphodiesterases) release diacyl glycerol or phosphatidic acid respectively.

The enzyme and the shading dye may show some interaction and should be chosen such that this interaction is not negative. Some negative interactions may be avoided by encapsulation of one or other of enzyme or shading dye and/or other segregation within the product.

Suitable proteases include those of animal, vegetable or microbial origin. Microbial origin is preferred. Chemically modified or protein engineered mutants are included. The protease may be a serine protease or a metallo protease, preferably an alkaline microbial protease or a trypsin-like protease. Preferred commercially available protease enzymes include Alcalase™, Savinase™, Primase™, Duralase™, Dyrazym™, Esperase™, Everlase™, Polarzyme™, and Kannase™, (Novozymes A/S), Maxatase™, Maxacal™, Maxapem™, Properase™, Purafect™, Purafect OxP™, FN2™, and FN3™ (Genencor International Inc.).

The method of the invention may be carried out in the presence of cutinase. classified in EC 3.1.1.74. The cutinase used according to the invention may be of any origin. Preferably cutinases are of microbial origin, in particular of bacterial, of fungal or of yeast origin.

Suitable amylases (alpha and/or beta) include those of bacterial or fungal origin. Chemically modified or protein engineered mutants are included. Amylases include, for example, alpha-amylases obtained from *Bacillus*, e.g. a special strain of *B. licheniformis*, described in more detail in GB 1,296,839, or the *Bacillus* sp. strains disclosed in WO 95/026397 or WO 00/060060. Commercially available amylases are Duramyl™, Termamyl™, Termamyl Ultra™, Natalase™, Stainzyme™, Fungamyl™ and BAN™ (Novozymes A/S), Rapidase™ and Purastar™ (from Genencor International Inc.).

Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g. the fungal cellulases produced from *Humicola insolens, Thielavia terrestris, Myceliophthora thermophila*, and *Fusarium oxysporum* disclosed in U.S. Pat. Nos. 4,435,307, 5,648,263, 5,691,178, 5,776,757, WO 89/09259, WO 96/029397, and WO 98/012307. Commercially available cellulases include Celluzyme™, Carezyme™, Endolase™, Renozyme™ (Novozymes A/S), Clazinase™ and Puradax HA™ (Genencor International Inc.), and KAC-500(B)™ (Kao Corporation).

Suitable peroxidases/oxidases include those of plant, bacterial or fungal origin. Chemically modified or protein engineered mutants are included. Examples of useful peroxidases include peroxidases from Coprinus, e.g. from *C. cinereas*, and variants thereof as those described in WO 93/24618, WO 95/10602, and WO 98/15257. Commercially available peroxidases include Guardzyme™ and Novozym™ 51004 (Novozymes A/S).

Enzyme Stabilizers

Any enzyme present in the composition may be stabilized using conventional stabilizing agents, e.g., a polyol such as propylene glycol or glycerol, a sugar or sugar alcohol, lactic acid, boric acid, or a boric acid derivative, e.g., an aromatic borate ester, or a phenyl boronic acid derivative such as 4-formylphenyl boronic acid, and the composition may be formulated as described in e.g. WO 92/19709 and WO 92/19708.

EXAMPLES

Dye Structures

| | structure |
|---|---|
| Dye 1 comparative An anionic azine dye | 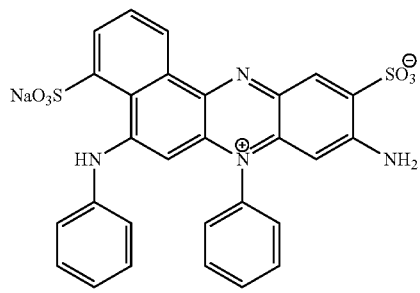 |
| Dye 2 comparative A cationic azine dye | 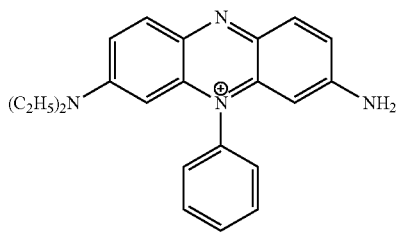 |
| Dye 18 | 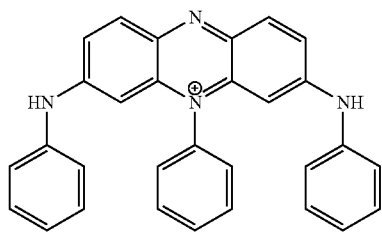 [SMILES: c1ccc(Nc2ccc3nc4ccc(Nc5ccccc5)cc4[n+](-c4ccccc4)c3c2)cc1] |

-continued

| | structure |
|---|---|
| Dye 20 | 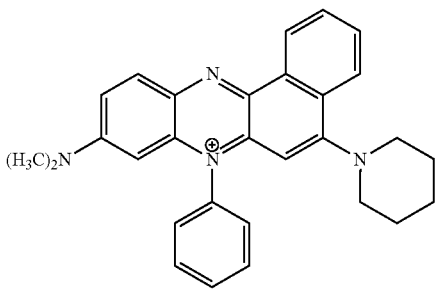 |
| Dye 24 | 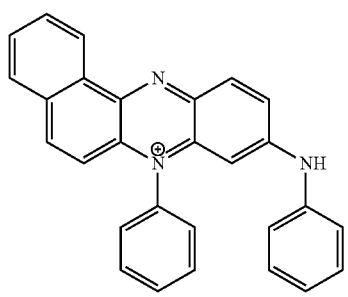 [SMILES: c1ccc(Nc2ccc3nc4c5ccccc5ccc4[n+](-c4ccccc4)c3c2)cc1] |

Example 1

Comparison of Dulling Properties

Woven Cotton and polycotton fabrics were washed in an aqueous wash solution (demineralised water) containing 1 g/L Linear Alkyl benzene sulfonate, 1 g/L sodium carbonate and 1 g/L sodium chloride at a liquor to cloth ratio of 30:1. To the wash solution shading were added such that the optical density (5 cm) at the maximum optical absorption in the range 400-750 nm was 0.1. After 30 minutes of agitation the clothes were removed rinsed and dried. After the wash the reflectance spectra measured on a reflectometer and the colour expressed as CIE L* a* b* values, and the whiteness expressed as the Ganz value.

The dulling of the cloth was expressed as the total colour deposited on the cloth given by the $\Delta E$ value:

$$\Delta E = [(L_c - L_d)^2 + (a_c - a_d) + (b_c - b_d)^2]^{0.5}$$

Where $L_c$, $a_c$, and $b_c$ are the CIE L a b values of the control cloths washed without dye And $L_d$, $a_d$, and $b_d$ are the are the CIE L a b values of the cloths washed with dye.

The increased in whiteness of the cloth was expressed as $$\Delta Ganz = Ganz(dye) - Ganz(control).$$

For each dye the effect of whitening, verses dulling the cloth was measured using the ratio $\Delta Ganz/\Delta E$; a higher value represents greater whiteness with less dulling.

The results are given in the table below.

| | $\Delta Ganz/\Delta E$ | |
|---|---|---|
| | cotton | Polycotton |
| Dye 1* | 7.0 | 6.5 |
| Dye 2* | 3.4 | 4.1 |

-continued

| | ΔGanz/ΔE | |
|---|---|---|
| | cotton | Polycotton |
| Dye 18 | 6.4 | 6.9 |
| Dye 20 | 5.0 | 5.8 |
| Dye 24 | 4.7 | 6.3 |

*comparative

Dyes 1, dye 18, dye 20, and dye 24 are much less dulling than dye 2.

Example 2

Comparison of Whitening Properties on Fabrics

Comparison of the ΔGanz values from experiment 1 showed that dye 6 gives a good whiteness increase to polycotton and cotton, unlike dye 1. This occurs because of great dye deposition to polycotton for dye 18, dye 20 and dye 24.

| | ΔGanz(cottons) | ΔGanz(polycottons) |
|---|---|---|
| Dye 1* | 22 | 5 |
| Dye 18 | 23 | 16 |
| Dye 20 | 14 | 11 |
| Dye 24 | 10 | 12 |

*comparative

Exemplary Base Powder Formulations A, B, C and D

| | Formulation | | | |
|---|---|---|---|---|
| | A | B | C | D |
| NaLAS | 15 | 20 | 10 | 14 |
| NI(7EO) | — | — | — | 10 |
| Na tripolyphosphate | — | 15 | — | — |
| Soap | — | — | — | 2 |
| Zeolite A24 | 7 | — | — | 17 |
| Sodium silicate | 5 | 4 | 5 | 1 |
| Sodium carbonate | 25 | 20 | 30 | 20 |
| Sodium sulphate | 40 | 33 | 40 | 22 |
| Carboxymethyl-cellulose | 0.2 | 0.3 | — | 0.5 |
| Sodium chloride | — | — | — | 5 |
| Lipase | 0.005 | 0.01 | — | 0.005 |
| Protease | 0.005 | 0.01 | — | 0.005 |
| Amylase | 0.001 | 0.003 | — | — |
| Cellulase | — | 0.003 | — | — |
| Acid Violet 50 | 0.0015 | 0.002 | — | — |
| Direct violet 9 | 0.0001 | — | — | — |
| Disperse violet 28 | — | 0.0002 | — | 0.0001 |
| cationic azine dye | 0.0015 | 0.002 | 0.002 | 0.003 |
| Fluorescer | 0.1 | 0.15 | 0.05 | 0.3 |
| Water/impurities/minors | remainder | remainder | remainder | remainder |

The powder formulations A, B, C and D were made up with dye 18, dye 20 and dye 24 from the examples respectively as the cationic azine dye.

Formulations were made using Lipex as the lipase, Savinase and Polarzyme and the protease, Carezyme as the cellulose and Stainzyme as the amylase.

DV28 is Dianix Brill Violet B, ex DyStar.

Exemplary Base Liquid Formulations A, B, C and D

| | Formulation | | | |
|---|---|---|---|---|
| | A | B | C | D |
| NaLAS | 14 | 10 | 15 | 21 |
| NI(7EO) | 10 | 5 | 21 | 15 |
| SLES(3EO) | 7 | 10 | 7 | — |
| Soap | 2 | 4 | 1 | 0 |
| Citric acid | 1 | 1 | — | 1 |
| Glycerol | 0 | 1 | 5 | 0 |
| Propylene glycol | 5 | 3 | 0 | 4 |
| Sodium chloride | 1 | — | — | — |
| Amine ethoxylated polymers | 0.5 | 1 | — | — |
| Triethanol amine | 0 | 0.5 | 3 | 1 |
| Perfume | 0.2 | 0.1 | 0.3 | 0.4 |
| Protease | 0.005 | 0.01 | — | 0.005 |
| Amylase | 0.001 | 0.003 | — | — |
| Lipase | — | 0.003 | — | — |
| Fluorescer | 0.1 | 0.15 | 0.05 | 0.3 |
| cationic azine dye | 0.002 | 0.003 | 0.0008 | 0.004 |
| Solvent Violet 13 | — | 0.0002 | 0 | 0.001 |
| Water/impurities/minors | remainder | remainder | remainder | remainder |

The liquid formulations A, B, C and D were made up with dye 18, dye 20 and dye 24 from the examples respectively as the cationic azine dye.

For both powder and liquids formulations, enzyme levels are given as percent pure enzyme. NI(7EO) refers to R—$(OCH_2CH_2)_nOH$, where R is an alkyl chain of C12 to C15, and n is 7. NaLAS is linear alkyl benzene sulphonate (LAS) and (SLES(3EO)) is $C_{12}$-$C_{18}$ alkyl polyethoxylate (3.0) sulphate.

A rinse conditioner formulation, for use in the rinse stage of the wash was also created. It contained 13.7wt % N,N-di(tallowoyloxyethyl)-N,N-dimethylammonium chloride, 1.5 wt % perfume 0.004 wt % dye 18, dye 20 and dye 24 from the examples respectively as the cationic azine dye, remainder minors and water.

We claim:

1. A method of treating a textile, the method comprising the steps of:
   (i) treating a textile with an aqueous solution of a blue or violet cationic azine dye, the aqueous solution comprising from 1 ppb to 1 ppm of the blue or violet cationic azine dye; and, from 0.0 g/L to 3 g/L of a surfactant; and,
   (ii) optionally rinsing and drying the textile, wherein the blue or violet cationic azine dye is not covalently bound to a negatively charged substituent, the azine dye selected from the following structure:

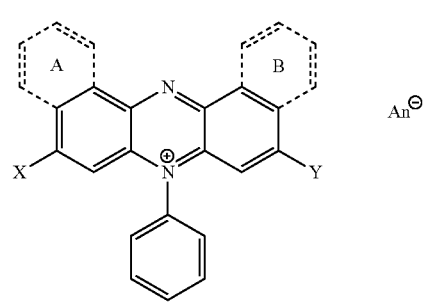

wherein An– is a negative anion;

rings A and B are absent or only one of rings A and B are present;

Y is selected from: —NHAr, wherein Ar is unsubstituted or substituted and is naphthyl or phenyl;

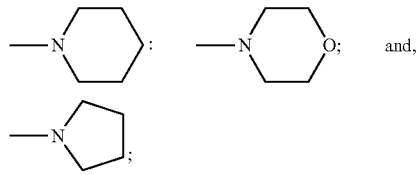

X is selected from H; C1-C4 branched or linear alkyl;

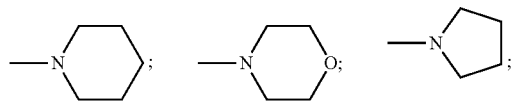

and when Y is selected from:

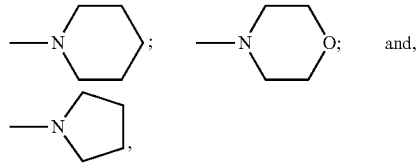

X may also be selected from —NR₁R₂, wherein R₁ and R₂ are selected from a polyether chain, benzyl, phenyl, amine substituted benzyl, amine substituted phenyl, COCH₃, a linear or branched alkyl chain; a linear or branched alkyl chain which may be substituted by one or more groups selected from: ester groups; Cl; F; CN; OH; CH₃O—; C₂H₅O—; and, phenyl; NHR₁; and, wherein when rings A and B are absent and when Y=—NHAr then X may also be selected from: —NH₂; —NHAr; and, —NHR₁.

2. A method as defined in claim 1, wherein Y is NHAr where Ar is phenyl or substituted phenyl.

3. A method according to claim 1, wherein rings A and B are absent.

4. A method according to claim 1 wherein Y is selected from:

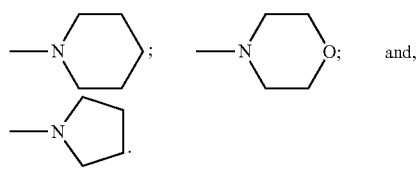

5. A method as defined in claim 1, wherein the cationic azine dye is selected from the following substituted and unsubstituted structures:

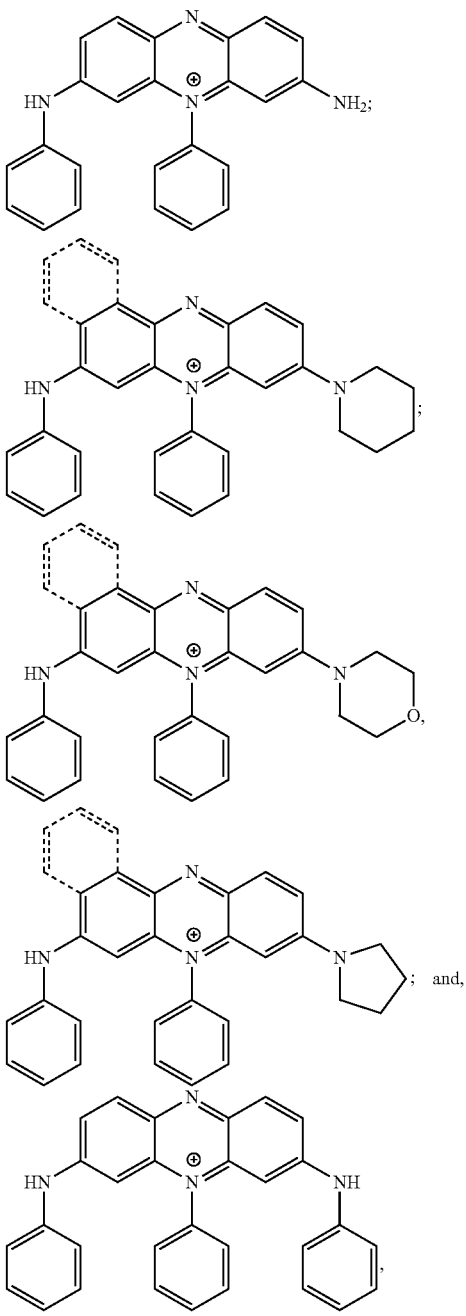

wherein the dashed ring may be present or absent.

6. A method according to claim 1, wherein the azine dye is further substituted by uncharged organic groups having a total molecular weight of less than 400.

7. A method according to claim 6, wherein the uncharged organic groups are selected from: NHCOCH₃, CH₃, C₂H₅, CH₃O, C₂H₅O, amine, Cl, F, Br, I, NO₂, CH₃SO₂, and CN.

8. A method according to claim 1, wherein the aqueous solution comprises a fluorescer in the range from 0.0001 g/l to 0.1 g/l.

9. A method according according to claim 8, wherein the fluorescer is selected from the group consisting of: sodium 2(4-styryl-3-sulfophenyl)-2H-napthol [1,2-d]triazole, disodium 4,4'-bis{[(4-anilino-6-(N methyl-N-2 hydroxyethyl) amino 1,3,5-triazin-2-yl)]amino}stilbene-2-2' disulfonate, disodium 4,4'-bis{[(4-anilino-6-morpholino-1,3,5-triazin-2-yl)]amino}stilbene-2-2' disulfonate, and disodium 4,4'-bis(2-sulfostyryl)biphenyl.

10. A method according to claim 1, wherein the aqueous solution comprises an enzyme selected from: proteases, alpha-amylases, cellulases, lipases, peroxidases/oxidases, pectate lyases, and mannanases.

* * * * *